March 7, 1939.                    C. H. BOUVY ET AL                    2,149,267
                                        FAN
                                Filed April 2, 1936
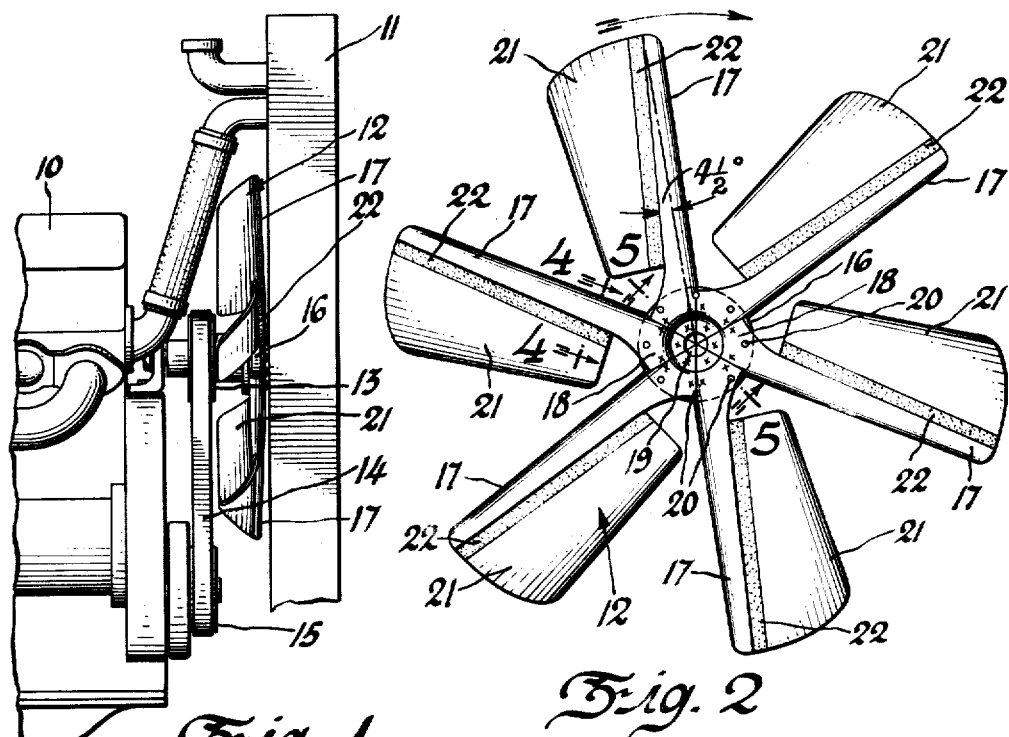
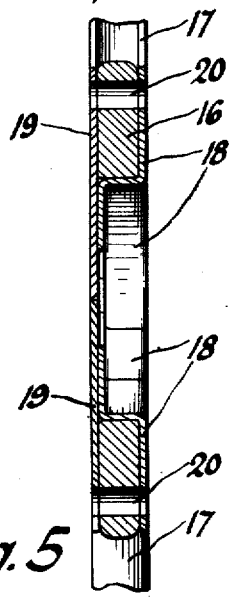
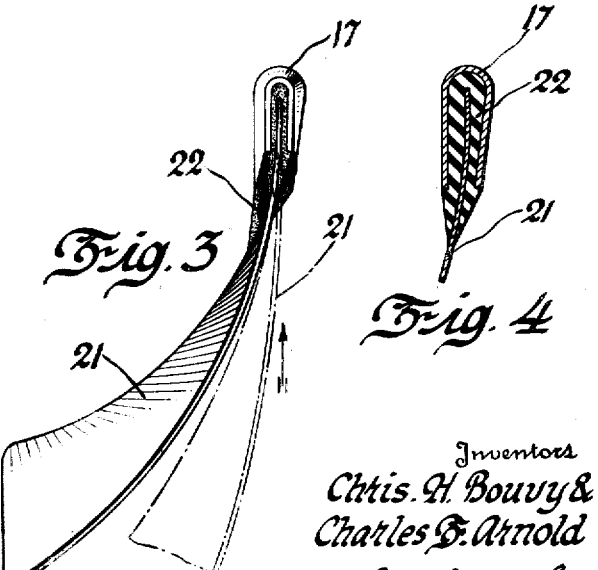
Inventors
Chris. H. Bouvy &
Charles F. Arnold
By Blackmore, Seaver & Flint
            Attorneys Patented Mar. 7, 1939

2,149,267

UNITED STATES PATENT OFFICE 2,149,267

FAN

Christiaan H. Bouvy and Charles F. Arnold, Detroit, Mich., assignors to General Motors Corporation, Detroit, Mich., a corporation of Delaware Application April 2, 1936, Serial No. 72,240

15 Claims. (Cl. 170—161)

If a fan of the type commonly used to circulate air through the radiator and over the propelling engine of an automotive vehicle of conventional design is designed so that it supplies enough air to cool the engine properly while the vehicle is moving relatively slowly, it supplies more air than is necessary to cool the engine properly and, consequently, consumes more power and creates more noise than is necessary when the vehicle is moving at high speeds.

The principal object of this invention is to provide a cooling fan for the propelling engine of an automotive vehicle which will supply enough air to cool the engine properly while the vehicle is moving relatively slowly and yet will supply no more air than is necessary to cool the engine properly while the vehicle is operating at high speeds and will, consequently, consume less power and create less noise than engine cooling fans of conventional design under the latter conditions.

For a better understanding of the nature and objects of our invention, reference is made to the following specification in which there is described the preferred embodiment of the invention which is illustrated in the accompanying drawing.

In the accompanying drawing:

Figure 1 is a view of a fan in which our invention is embodied, installed between the radiator and the propelling engine of an automotive vehicle of conventional design.

Figure 2 is a front elevation of the fan.

Figure 3 shows one of the arm and blade assemblies of the fan viewed from its outer end.

Figure 4 is an enlarged section taken on the line 4—4 of Figure 2.

Figure 5 is a further enlarged section taken on the line 5—5 of Figure 2.

In the drawing, the reference character 10 indicates the water-cooled propelling engine of an automotive vehicle of conventional design and the reference character 11 the radiator by which the engine cooling water is cooled. The engine is disposed in advance of the body of the vehicle and the radiator in advance of the engine so that forward movement of the vehicle causes air to circulate through the radiator and over the engine. To supplement the current of cooling air which circulates through the radiator and over the engine due to the movement of the vehicle, particularly when the vehicle is moving slowly, there is disposed between the engine and the radiator a fan 12 of the screw type. The fan 12 is secured to a pulley 13 which is mounted so that it can rotate on a shaft (not shown) carried by the engine and is driven at a rate of speed which is proportional to the speed of the engine by a belt 14 which passes around the pulley 13 and a pulley 15 fixed to the crankshaft of the engine.

The fan includes an annular hub 16 and rigid, inflexible channel-shaped arms 17 which gradually decrease in depth and width from their inner to their outer ends. The flanges of the arms are extended beyond the inner ends of the webs thereof to provide what may be referred to as legs which straddle and extend beyond the inner edge of the hub. The arms are secured to the hub by forming the extension 18 of one flange of each arm so that it conforms in shape to and fits snugly the inner edge of the hub and the adjacent portion of the inner face of the extension 19 of the arm which is located within the boundaries of the inner edge of the hub, spot welding the juxtaposed portions of the extensions 18 and 19 of each arm together and spot welding the extensions to the hub.

The flanges of the arms 17 are disposed parallel to the plane of the hub 16 and the convex sides of all of them face in the direction of rotation of the fan. The extensions 19 of the flanges of the arms 17 are shaped like segments of a circle and the extensions 18 so that, when they are formed as described and shown in the drawing, their projections coincide in shape and size with the extensions 18, except in that they terminate short of the center of the hub 16. The angular dimension of each extension 18 is equal to a circumference divided by the number of arms of the fan and the radial edges of the extensions of each arm, consequently, abut against radial edges of the extensions of the arms on each side of it. The radial edges of the extensions 18 and 19 are disposed at such angles to the channel-shaped portions of the arms that the arms 17 are spaced equiangularly around the axis of the hub 16 and the free edges of the flanges of the channel-shaped portions are inclined in the direction of rotation of the fan at angles of about four and one-half degree (4½°) to the lines radial to the axis of rotation of the fan which intersect them at their outer extremities.

Into the channel of each arm, there extends the leading edge of a blade 21 of thin, flexible and resilient steel which is curved transversely so that its trailing edge, its center of pressure and its center of gravity are located without the plane of rotation of the arms 17. Between the leading edge of the blade and the walls of the channel, there is interposed padding 22 which permits some movement of the blades 21 bodily with respect to the arms 17 and prevents concentration of bending stresses which might cause the blade to crack or break at the joint between it and the arm. The padding 22 is preferably made of soft rubber or a rubber-like material in the form of a channel-like strip whose free edges are feathered and extend outwardly beyond the free edges of the channel and vulcanized or otherwise bonded to the blade and the walls of the channel. By the term "rubber-like material" we, of course, mean material which resembles soft rubber in yieldability and elasticity.

The fan 12 is secured to the pulley 13 coaxially therewith and so that the trailing edges of its blades 21 extend away from the radiator 11 and toward the engine 10 by screws (not shown) which extend through the openings 20 in the hub 16 and the extensions 18 and 19 of the arms 17. When the fan is installed in the described manner and the engine 10 is operating, the fan is driven through the pulleys 15 and 13 and the belt 14 in the direction indicated by the arrows in Figures 2 and 3 at a rate of speed which is proportional to the speed of the engine and, consequently, draws air through the radiator 11 and circulates it over the engine. While the fan is operating, the resistance of the atmosphere to the passage of the blades of the fan through it, tends, as Figure 3 indicates, not only to flex the blades and thus reduce their transverse curvature or flatten them but also to swing the blades bodily into the plane of rotation of the arms 17. Consequently, when the speed of the fan is increased, the pitch of its blades decreases. The result of this is that the rate at which the fan 12 delivers air does not increase in proportion to its rate of rotation and, consequently, if the fan is designed so that it will deliver air at the same rate as a fan of conventional design at relatively low speeds it will deliver less air and, consequently, consume less power and create less noise than the latter at higher speeds. This characteristic of our fan renders it peculiarly suited for use as an engine cooling fan in automotive vehicles of conventional design in which the circulation of air due to the movement of the vehicle does not satisfy the engine cooling air requirement while the vehicle is moving relatively slowly but more and more nearly satisfies it as the speed of the vehicle increases.

The blades 21 of the fan 12 naturally tend to swing bodily and to flex along lines generally parallel to the free edges of the channel-shaped portions of the arms 17. Consequently, since these edges of the arms are not inclined oppositely to the direction of rotation of the fan, all decreases in the pitch of the blades are accompanied by movements of the centers of gravity of the blades away from the axis of rotation of the fan. Therefore, while the fan is operating, centrifugal force, as well as air resistance, always tends to reduce the pitch of the blades by swinging them into the plane of rotation of the arms 17 and flattening them or reducing their transverse curvature. However, air resistance is the predominant force and our fan, consequently, tends to deliver a constant weight rather than a constant volume of air per unit of time when it is operating at a given speed and, therefore, when it is employed to supply cooling air, to eliminate discrepancies in cooling efficiency under different atmospheric pressure and temperature conditions. In explanation of the statement made in the next preceding sentence, we point out that the density of the atmosphere increases when its temperature falls or its pressure rises and vice versa, that the resistance of the atmosphere to the passage of the blades of a fan through it increases when the density of the atmosphere increases and vice versa and, consequently, that when our fan is operating at a given speed the pitch of its blades will be smaller and it will deliver a smaller volume of air per unit of time when the atmospheric pressure is high or the temperature low than when the pressure is low or the temperature high and vice versa.

Although we have shown and described our fan as the engine cooling fan of an automotive vehicle of conventional design, we, of course, apprehend that it may be used for other purposes and do not consider that our invention is limited to the use of the fan in the environment in which it has been shown and described.

We claim:

1. In a screw propeller, a hub, a channel-shaped arm secured to the hub, a blade of which one edge extends into the open side of the arm, and a strip of rubber-like material interposed between the walls of the arm and the mentioned edge of the blade.

2. In a screw propeller, a hub, a channel-shaped arm secured to the hub, a flexible blade of which one edge extends into the open side of the arm, and a strip of rubber-like material interposed between the walls of the arm and the mentioned edge of the blade and embracing a portion of the blade without the walls of the arm.

3. A screw propeller which includes a hub, an arm whose inner end is bifurcated and is secured to the hub with one of its legs on each side of it, and a blade mounted on the arm with its leading edge connected thereto.

4. In a screw propeller, a hub, and a channel-shaped arm whose flanges extend beyond the inner end of its web and are disposed on opposite sides of and secured to the hub.

5. In a screw propeller, an annular hub, and an arm whose inner end is bifurcated and straddles and whose bifurcations are joined within the boundaries of the inner edge of the hub.

6. In a screw propeller, an annular hub, and a channel-shaped arm whose flanges extend beyond the inner end of its web and are disposed on opposite sides of the hub and extend beyond its inner edge—the extension of one of the flanges being formed so that it conforms in shape to and fits snugly the inner edge of the hub and the adjacent portion of the extension of the other flange which is located within the boundaries of the inner edge of the hub.

7. In a screw propeller, a rotatable hub, an arm which is secured to and extends away from the hub at an angle to its axis of rotation, and a blade mounted on the arm with its leading edge connected thereto and its trailing edge free thereof so that it may move with respect thereto throughout its length—the arm and the blade being so constructed and arranged that the trailing edge of the blade is yieldingly biased to a position in which it is inclined to the path in which the arm travels and swings about an axis which extends lengthwise of the arm and is inclined in the direction of rotation of the propeller.

8. In a screw propeller, a rotatable hub, an arm which is secured to and extends away from the hub at an angle to its axis of rotation, and a flexible blade mounted on the arm with its leading edge connected thereto and its trailing edge free thereof so that it may move with respect thereto throughout its length—the arm and the blade being so constructed and arranged that the blade flexes along lines which extend lengthwise of the arm and are inclined in the direction of rotation of the propeller and the trailing edge of the blade is yieldingly biased to a position in which it is inclined to the path in which the arm travels.

9. In a screw propeller, a rotatable hub, an arm which is secured to and extends away from the hub at an angle to its axis of rotation, a blade which is mounted on the arm with its leading edge connected thereto and its trailing edge free thereof so that it swings about an axis which extends lengthwise of the arm and is inclined in the direction of rotation of the propeller and the trailing edge of the blade is yieldingly biased to a position in which it is inclined to the path in which the arm travels.

10. In a screw propeller, a hub, an arm connected to the hub, a blade, and a body of rubber-like material through which the blade is connected to the arm so that it may move with respect thereto.

11. In a screw propeller, a hub, a channel-shaped arm connected to the hub with its convex side facing and the edges of its open side inclined in the direction of rotation of the propeller, and a blade secured to the arm with its leading edge within the channel and its trailing edge free thereof.

12. In a screw propeller, a hub, an arm secured to the hub, a flexible blade mounted on the arm, and padding interposed between the blade and the arm to prevent concentration of bending stresses at the junction of the blade and the arm.

13. In a screw propeller, a hub, an arm connected to the hub, a flexible blade, and a body of rubber-like material through which the blade is mounted on the arm so that it may move with respect thereto.

14. In a screw propeller, a hub, a channel-shaped arm connected to the hub with its convex side facing and the edges of its open side inclined in the direction of rotation of the propeller, a flexible blade of which one edge extends into the open side of the arm, and a strip of rubber-like material interposed between the walls of the arm and the edge of the blade that extends into it.

15. In a screw propeller, a rotatable hub, an arm which is secured to and extends away from the hub at an angle to its axis of rotation, a flexible blade mounted on the arm with its leading edge connected thereto and its trailing edge free thereof so that it may move with respect thereto throughout its length—the arm and the blade being so constructed and arranged that the blade flexes along lines which extend lengthwise of the arm and are inclined in the direction of rotation of the propeller and the trailing edge of the blade is yieldingly biased to a position in which it is inclined to the path in which the arm travels, and padding interposed between the blade and the arm to prevent concentration of bending stresses at the junction of the blade and the arm.

CHRIS. H. BOUVY.
CHARLES F. ARNOLD.

CERTIFICATE OF CORRECTION.

Patent No. 2,149,267.    March 7, 1939.

CHRISTIAAN H. BOUVY, ET AL.

It is hereby certified that error appears in the printed specification of the above numbered patent requiring correction as follows: Page 1, second column, line 43, for the word "degree" read degrees; page 3, first column, line 14, claim 9, after "it" insert the words may move with respect thereto throughout its length and; and that the said Letters Patent should be read with this correction therein that the same may conform to the record of the case in the Patent Office.

Signed and sealed this 25th day of April, A. D. 1939.

Henry Van Arsdale
Acting Commissioner of Patents.

(Seal)

spect thereto throughout its length—the arm and the blade being so constructed and arranged that the blade flexes along lines which extend lengthwise of the arm and are inclined in the direction of rotation of the propeller and the trailing edge of the blade is yieldingly biased to a position in which it is inclined to the path in which the arm travels.

9. In a screw propeller, a rotatable hub, an arm which is secured to and extends away from the hub at an angle to its axis of rotation, a blade which is mounted on the arm with its leading edge connected thereto and its trailing edge free thereof so that it swings about an axis which extends lengthwise of the arm and is inclined in the direction of rotation of the propeller and the trailing edge of the blade is yieldingly biased to a position in which it is inclined to the path in which the arm travels.

10. In a screw propeller, a hub, an arm connected to the hub, a blade, and a body of rubber-like material through which the blade is connected to the arm so that it may move with respect thereto.

11. In a screw propeller, a hub, a channel-shaped arm connected to the hub with its convex side facing and the edges of its open side inclined in the direction of rotation of the propeller, and a blade secured to the arm with its leading edge within the channel and its trailing edge free thereof.

12. In a screw propeller, a hub, an arm secured to the hub, a flexible blade mounted on the arm, and padding interposed between the blade and the arm to prevent concentration of bending stresses at the junction of the blade and the arm.

13. In a screw propeller, a hub, an arm connected to the hub, a flexible blade, and a body of rubber-like material through which the blade is mounted on the arm so that it may move with respect thereto.

14. In a screw propeller, a hub, a channel-shaped arm connected to the hub with its convex side facing and the edges of its open side inclined in the direction of rotation of the propeller, a flexible blade of which one edge extends into the open side of the arm, and a strip of rubber-like material interposed between the walls of the arm and the edge of the blade that extends into it.

15. In a screw propeller, a rotatable hub, an arm which is secured to and extends away from the hub at an angle to its axis of rotation, a flexible blade mounted on the arm with its leading edge connected thereto and its trailing edge free thereof so that it may move with respect thereto throughout its length—the arm and the blade being so constructed and arranged that the blade flexes along lines which extend lengthwise of the arm and are inclined in the direction of rotation of the propeller and the trailing edge of the blade is yieldingly biased to a position in which it is inclined to the path in which the arm travels, and padding interposed between the blade and the arm to prevent concentration of bending stresses at the junction of the blade and the arm.

CHRIS. H. BOUVY.
CHARLES F. ARNOLD.

CERTIFICATE OF CORRECTION.

Patent No. 2,149,267.   March 7, 1939.

CHRISTIAAN H. BOUVY, ET AL.

It is hereby certified that error appears in the printed specification of the above numbered patent requiring correction as follows: Page 1, second column, line 43, for the word "degree" read degrees; page 3, first column, line 14, claim 9, after "it" insert the words may move with respect thereto throughout its length and; and that the said Letters Patent should be read with this correction therein that the same may conform to the record of the case in the Patent Office.

Signed and sealed this 25th day of April, A. D. 1939.

Henry Van Arsdale
Acting Commissioner of Patents.

(Seal)